United States Patent Office 3,508,146
Patented Apr. 21, 1970

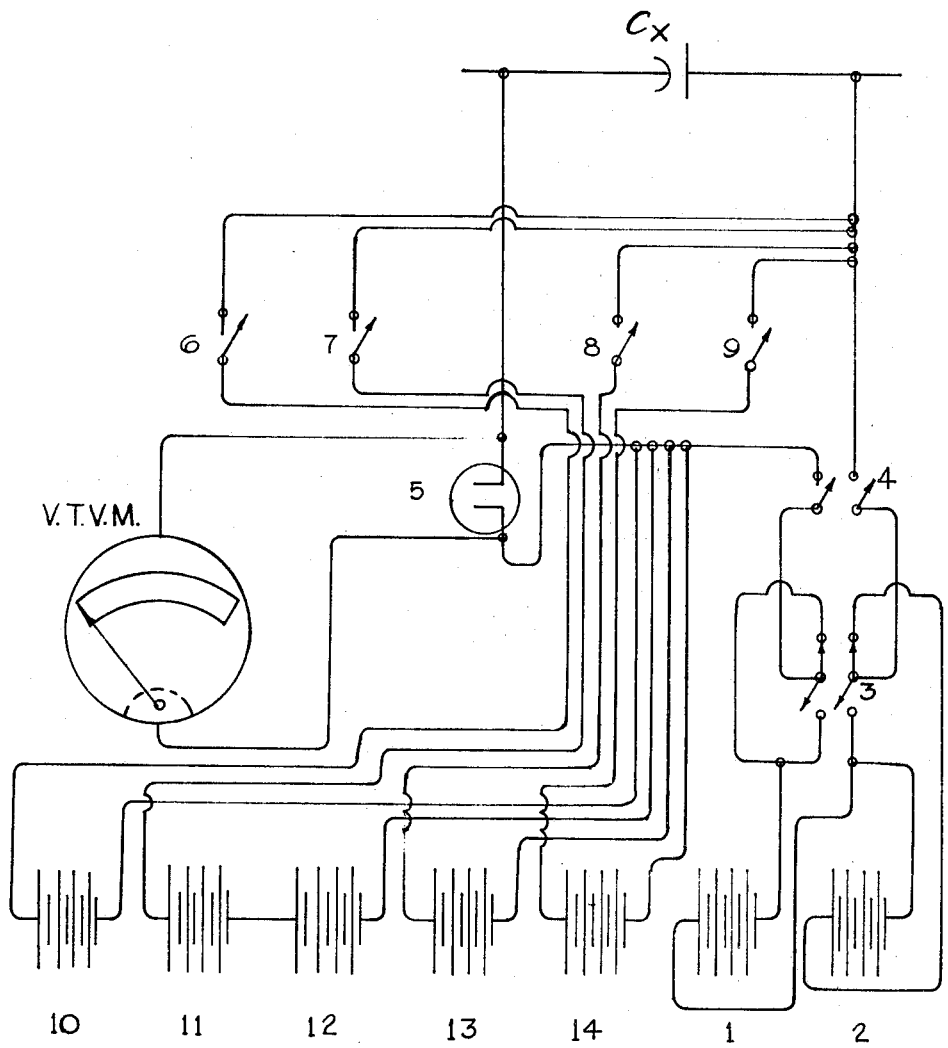

3,508,146
MEASUREMENT OF VOLTAGE-LEAKAGE IN CAPACITORS
Thomas Jefferson Jackson, 2203 Summerville Road, Phenix City, Ala. 36867
Continuation of application Ser. No. 471,856, July 14, 1965. This application Aug. 14, 1968, Ser. No. 756,720
Int. Cl. G01r 11/52, 27/26
U.S. Cl. 324—60       1 Claim

ABSTRACT OF THE DISCLOSURE

A method and means employing a neon bulb and a VTVM for visually indicating and accurately measuring the exact value of any voltage-leakage and analyzing the condition of a capacitor while it remains connected to a substantially no-load test circuit.

---

This application is a continuation of my pending application bearing Ser. No. 471,856, filed July 14, 1965, now abandoned.

The present invention relates to a capacitor tester and more particularly to measurement of voltage-leakage in capacitors.

In prior art, and presently being marketed, there are numerous types and makes of capacitor testers. Varied types of tests can be made with such devices and most of these devices successfully do what they are specifically designed for. Commonly tests are made of the capacitive values and internal or leakage resistance of capacitors. Depending upon needs, such tests are useful and of value.

However, certain important factors have previously been overlooked. In most electric and electronic equipment, including radios, television receivers, audio amplifiers, and the like—in fact in almost all except precision laboratory equipment—the capacitors used are generally designated to the accurate only to plus or minus 10% of their marked capacity value. It is therefore apparent that the exact capacity value is not essential in such electronic circuitry and that considerable change in value from that when initially installed will not materially effect the operation of the apparatus. Therefore, tests or measurement of exact capacity values of capacitors used in such circuits prove of minor consequence in most cases.

Leakage resistance of capacitors is of more importance and tests which measure such resistance better indicate whether certain troubles are being caused by defective capacitors.

Actually, though, it is truly the voltage leakage of a capacitor which most detrimentally effects a circuit. Especially in D.C. circuits such voltage leakage is, of course, primarily determined by the leakage resistance. Despite this basic concept, the actual, detrimental, voltage leakage also depends very much upon the exact positioning and usage of a capacitor in a circuit and the circuitry, voltages and other factors involved—more so in many cases than upon the actual ohmage of the leakage resistance. As an example, a leakage resistance of 1000 ohms in a capacitor might permit only such a minor amount of voltage leakage as to be insignificant in some circuits; yet this same 1000 ohm leakage resistance could prove calamitous in other circuits. Not only the fixed resistor values but also the other components, total current drain and usage of the circuit are of major importance in this regard; as for instance whether it is a plate circuit or a biased grid circuit when vacuum tubes are employed.

Testing of a capacitor while under load, as when a ohmmeter is used for checking leakage resistance, cannot show the true voltage leakage as does the presently disclosed method. Similarly, readings of applied voltage in operational circiuts will not indicate whether discrepancies in voltage are due to leakage in capacitors or might be from other causes, such as changes in resistor values, defective vacuum tubes or transistors, etc.

With the foregoing in mind, the present invention provides an improved and simplified method and means for directly indicating and/or measuring and analyzing the voltage leakage of a capacitor under substantially no-load conditions. This cannot be successfully accomplished on any of the previous well-known types of capacitor testers. In addition, and simultaneously with the voltage leakage measurement, this analyzer indicates whether the capacitor is good or if it is open or shorted.

In its simplest form this analyzer may be constructed as a separate unit incorporating a neon bulb indicator and used independently or in combinnation with a VTVM, or the device might be constructed integral of a VTVM, thus providing the instrument with this added function.

The primary object of the present invention is to provide a new and improved method and means of analyzing capacitors for voltage leakage and for also indicating whether a capacitor is good, open or shorted.

Other objects are to accomplished the desired result simply and with a minimum of components.

Still further objects will become apparent from the following description, with the accompanying drawing and the appended claim.

A simplified arrangement of components is shown in circuit diagram form in the drawing, in which:

1 and 2 represent like 67½ volt batteries, 3 is a DPDT switch and 4 is a DPST switch which can have fixed on and off positions or might be a spring loaded normally-open momentary contact switch. 5 is a neon bulb indicator while, 6, 7, 8 and 9 are shown as identical spring loaded normally-open SPST momentary contact switches. 10, 11 and 12 are 1½ volt batteries, 13 is a 15 volt battery and 14 is a 30 volt battery. V represents a vacuum tube voltmeter (VTVM) and X-1 and X-2 are the test points or leads which are connected across the capacitor C which is to be tested or analyzed. This comprises all of the individual components of the circuit as shown.

For the sake of simplicity the circuit in the drawing is shown as battery powered and this also indicates that D.C. voltage is being used. Obviously properly filtered D.C. voltage derived from rectified A.C. voltage can also be used as a source to supply this circuit. Preferably such D.C. voltage when derived from rectified A.C. should be regulated for greatest precision. Also, while separate switches are shown, with individual or tapped battery sources, a single rotary step switch could as readily be used, or especially with D.C. derived from rectified A.C., means such as a potentiometer or a variable power transformer could be employed to provide a variable D.C. voltage source.

As shown, switch 3 in the down position connects 67½ volt battery 1 to the on-off switch 4. In the up position switch 3 connects the two 67½ volt batteries 1 and 2 in a series circuit thus providing a 135 volts supply to switch 4.

Whether it be of fixed position or a normally-open momentary contact type, switch 4 acts to connect the voltage selected by DPDT switch 3 into the test circuit. Test lead X-1 is directly connected to one side of the applied D.C. voltge as shown in the drawing. The other side of the D.C. source is connected to one terminal of the neon bulb indicator 5, and the second terminal of indictaor 5 is connected to the second test lead X-2. Test leads X-1 and X-2, preferably terminating in alligator or test clips, are then attached to any capacitor C which it is desired to analyze in order to determine its working quality—open, leaking, shorted or good.

With switch 4 in the open position, any of the individual momentary contact switches 6, 7, 8 or 9 may be used to connect any one of the other lower battery voltages into the test circuit. Thus capacitors of various low voltage ratings such as used in transistor circuits may be tested and analyzed without damaging them by impressing too high a voltage.

When a VTVM is used in conjunction with the analyzer, the VTVM, shown and marked as V, is connected directly across the terminals of indicator 5, or the VTVM could be used in place of the neon bulb indicator 5. Use of a VTVM is not essential but is most desirable to obtain greatest accuracy and for the ultimate use of the invention. Voltage scales only are used on the VTVM and naturally correct polarity must be observed.

As stated, the open-circuit (high resistance, or no-current) voltage leakage of a capacitor is generally of the greatest importance in determining the true efficiency of the capacitor. The presently described analyzer tests capacitors, under substantially such no-load conditions, since both the neon bulb indicator and the VTVM draw a minimum of current.

Also of importance, an additional feature of this invention is that it will indicate whether a capacitor is open or good, as well as shorted. This feature is particularly useful in testing capacitors of extremely low capacity values, such as only a few micro-microfarads.

To accomplish the desired purpose, the operation of the presently disclosed analyzer is as simple as the circuitry involved.

Effective tests of most capacitors rated at 25 volts or higher and of even extremely low capacity values can be made by use of the neon bulb indicator 5. Therefore this device may be considered as a complete anlayzer unit in itself which may be or need not be used in combination with a VTVM.

To test capacitors of any type or value, except those of very low voltage rating, only battery 1 (67½ volts) or batteries 1 and 2 in series (135 volts) are connected into the test circuit. This is done by use of switches 3 and 4.

For testing any capacitor having a rating of 100 volts or higher, switch 3 is closed in the "up" position, thus providing a source of 135 volts with batteries 1 and 2 being series connected.

Test leads X-1 and X-2 are connected across the capacitor C to be tested. While carefully watching neon bulb indicator 5, switch 4 is then closed and during the test it is left in the closed position or is held in this closed position if it is of the momentary contact type. With any capacitor, regardless of capacity value and "perfect" in that it has no voltage leakage, neon bulb indicator 5 will instantaneously flash on when switch 4 is closed and remain lighted as the capacitor C is being charged from the 135 volt source, the light going out when the capacitor is charged. If the capacitor C is of low capacity value and has no voltage leakage, the light in neon bulb indicator 5 will almost instantly go out. With increasingly larger values of capacitors neon bulb indicator 5 will remain lighted for longer periods and it will then go out and remain extinguished after the capacitor C being tested is fully charged and providing the capacitor is good and has little or no voltage leakage. If, however, there is an excessive amount of voltage leakage in capacitor C or if the capacitor C is shorted, neon indicator 5 will remain lighted and will not be extinguished. With a critical amount of voltage leakage the light in neon indicator 5 might flash on and off after first being extinguished. This condition results from a gradual build up of charge and discharge of capacitor C by reason of such voltage leakage. In some cases indicator 5 might remain dimly lighted and not be completely extinguished if there is just a sufficient amount of continuous voltage leakage. As will be further described, such a condition might be normal when testing electrolytic capacitors but it always denotes a defective electrostatic capacitor.

Obviously the simple test heretofore described visually indicates by the first and even though instantaneous, flash of light in neon bulb indicator 5 that the capacitor C is not open-circuited as by broken leads, otherwise indicator 5 would not light up at all. Such a lighting of indicator 5 first occurs during the initial charging of capacitor C and only during this charging time if the capacitor is good and unless the capacitor is shorted or has excessive leakage.

Since the neon bulb indicator 5 draws only a minimum of current, the simple test described will clearly indicate the relative amount of voltage leakage in a capacitor. For our purpose we need not be interested in the exact striking voltage of the neon bulb indicator 5. However it is important to know that the extinguishing voltage of such neon bulbs is in the order of 45 volts. Therefore when the capacitor C being tested reaches a charge of about 45 volts less than the 135 volt source and stops drawing current the light in the neon bulb will go out and will remain extinguished so long as the capacitor C maintains its charge. If however capacitor C loses its charge (voltage leakage) to the extent that its charge voltage is less than the difference between the source voltage and the required striking voltage of neon bulb indicator 5, the neon bulb will again light up and will remain lighted for the time it takes to again charge capacitor C to the voltage where indicator 5 will be extinguished. There is only a few volts difference between the striking and extinguishing voltage of the neon bulb indicator 5 employed. Therefore even small amounts of voltage leakage in the capacitor C being tested become readily apparent in this simple test. It will also be apparent that, since no current flows through the external test circuit during the time the neon bulb indicator 5 remains extinguished, any voltage leakage which does reduce the charge in capacitor C must occur within the capacitor itself. Such a no-lead test cannot possibly be accomplished when the usual types of leakage resistance tests are made, nor in fact in any tests where a closed external circuit is maintained. Actually in the present device the neon bulb indicator 5 acts as a switch which completely opens the external test circuit after the capacitor is charged and when the neon bulb is extinguished. When lighted, and during the charge period, the neon bulb provides a low resistance path.

From the above it will be seen that even when using the presently disclosed device by itself and by means of neon bulb indicator 5, without combination with a VTVM, a capacitor can be effectively tested and analyzed.

For even finer analysis, and particularly with capacitors of very small capacity value and/or of low voltage ratings, a VTVM V is connected across the neon bulb indicator 5 as shown in the drawing or could be used alone and in place of the neon bulb indicator. Because of the extremely high input resistance of a VTVM, such instruments can be and normally are considered as substantially no-load devices. First using a correctly poralized voltage scale of the VTVM V which is higher than the source voltage and then progressively using lower voltage scales if desired for greater needle deflection, actual leakage voltage can be read. Using the lowest voltage scale on the VTVM V it can easily be determined by the upward swing of the voltmeter needle that the circuit is not open and that a capacitor of even extremely low capacity value is properly receiving a charge. Obviously, the upward flick of the needle will be instantaneous and with very low capacitive values it will return almost instantly to its zero position if the capacitor is good and has no voltage leakage. However the needle will remain upward and thus give some voltage indication when leakage or a short exists in the capacitor. Electrostatic capacitors should test equally good (or bad) regardless of polarity.

Obviously electrolytic capacitors should show high voltage leakage in one direction but low leakage in the opposite direction. Generally, and without detriment to the circuits they are commonly employed in, such as filter circuits, electrolytic capacitors do have much lower internal or leakage resistance than do electrostatic capacitors. Therefore the ratio of resistance is often taken as an indication of whether or not electrolytic capacitors are good or are defective (similarly in many respects to tests of rectifiers). Again voltage leakage is actually of more importance than leakage resistance and the present device can also be used to test and analyze electrolytic capacitors, regardless of capacity and voltage ratings. Tests are similarly made except that polarity is important and must be adhered to. Results of such tests of electrolytic capacitors must be differently analyzed than tests of electrostatic capacitors.

As previously described, when testing a capacitor C the light in neon bulb indicator 5 may flash on and off under some conditions, thus denoting a defective electrostatic capacitor. Such flashing on and off may be considered normal in testing an electrolytic capacitor, taking into account the lower internal resistance of such a capacitor. Certain factors in this repeated lighting and extinguishing of the neon bulb indicator 5 are used in determining the excellence of an electrolytic capacitor.

Electrolytic capacitors most often being of substantially greater capacity than are electrostatic capacitors it is to be expected that they will take considerably longer to charge up from a given source. Therefore, when capacitor C is of electrolytic type and is being tested in the manner described, the neon bulb indicator 5 will initially remain lighted for a seemingly long time—perhaps two minutes with very high capacities—and might remain dimly lighted for some time before it is completely extinguished. It will eventually be extinguished and then, after a slight pause, it will relight and remain lighted for approximately as long a time as it was extinguished. This almost rhythmatic on-and-off procedure continues indefinitely if the electrolytic capacitor is good. How good and how much voltage leakage exists can be quite well analyzed by the length of time required for full re-charging and partial discharging as indicated by the on-and-off action of the neon bulb indicator 5. Excessive voltage leakage, denoting a bad capacitor, will cause the neon indicator 5 to remain lighted. Obviously the foregoing test depends upon properly connecting an electrolytic capacitor in regard to polarity. With reversed polarity there is and normally should be a considerable and continuous voltage leakage and therefore the neon indicator 5 will remain continuously lighted. Of course, even better and quicker analysis can be made by using the VTVM V and reading the voltages as the indicator needle moves up and down in synchronization with the neon lamp indicator.

The procedure for testing capacitors having voltage ratings in the range of 25 to 75 volts is identical to that described except that switch 3 is placed in the down position, thus providing a source of 67½ volts derived from battery 1. Indications given by neon bulb 5 or the VTVM and the analysis therefrom are substantially the same except that the voltage actually employed to charge a capacitor C is thereby kept lower than the rated voltage of the capacitor, after subtracting the voltage drop of the neon bulb indicator 5.

Obviously higher D.C. voltages could be used when testing capacitors of higher voltage ratings. This can readily be done if the D.C. is derived from rectified A.C. However, it has been found that 135 volts D.C. is highly satisfactory and such a voltage is most practical when batteries are employed as the source.

For capacitors such as employed in transistor circuits and the like and having voltage ratings of 25 volts or less—a slightly different procedure must be followed but the result is the same. In such case switches 3 and 4 connecting batteries 1 and 2 are not used. Depending upon the voltage rating of the capacitor to be tested, any one of the switches 6, 7, 8 or 9 is used to connect its related voltage source, batteries 10 (1½ volts), 11 and 12 in series (3 volts total), 13 (15 volts), or 14 (30 volts). When using any of these lower voltage sources, as selected by switches 6, 7, 8 or 9, the VTVM V must be used as the indicator since none of these sources provide a voltage high enough to strike neon bulb 5 and therefore neon bulb 5 cannot be used as an indicator.

After a capacitor has been tested in the manner described, it is necessary to discharge it before it is tested a second time, if such a re-test is desired. This can be done by simply shorting the capacitor leads or terminals. Otherwise the test leads X-1 and X-2 can be reversed or a reversing switch could be used to do this and the capacitor thus tested in reverse polarity.

It is to be noted that by reversing the test lead connections to re-test a capacitor the previous charge voltage retained by the capacitor, if it is good or has little voltage leakage, will be added to the voltage applied by the battery switch for the re-test and thus the visible indication during charge will be greatly increased on either or both the neon bulb or the VTVM. This is of most importance since it produces more positive visual indication when testing capacitors of extremely low capacitive value.

To accurately test capacitors which are already wired into a circuit or piece of equipment it is recommended and desirable to first unsolder or otherwise completely disconnect one side of the capacitor from the circuit. The foregoing test procedure can then be followed.

If a defective capacitor is replaced with another, even partially defective capacitor, it is obvious that the circuit will not even then be made fully efficient. Unfortunately this situation often occurs.

It has been found by the test procedure herein disclosed and described that a certain percentage of new and previously unused capacitors do have voltage leakage and are therefore defective to a greater or lesser degree. Therefore, and especially since the present device and method is so simple, it is highly recommended that all new capacitors be tested before they are connected into a circuit either as a new or replacement component.

Summarizing: from the foregoing it will be apparent that analysis of the condition of a capacitor can be quickly and easily made from the visual indications obtained on either the neon bulb or the VTVM; greater accuracy, of course, being obtained from VTVM readings.

Upon closing of the switch connecting the capacitor into the circuit:

(1) If no visible indication; neon bulb does not light (or there is no movement of VTVM needle)—capacitor is open and therefore defective.

(2) If light comes on and remains on in neon bulb (or VTVM needle deflects and remains upward on scale)—capacitor is shorted or has an excessive amount of voltage leakage and obviously is defective.

(3) If light comes on and then goes out and remains extinguished in neon bulb indicator (or VTVM needle moves upward, then returns to zero)—capacitor has accepted charge and can be considered good.

(4) If after light comes on, then goes off in neon bulb, it then comes back on (or if VTVM needle again rises)—capacitor has an objectionable amount of voltage leakage and is defective. Rapidity and duration of this on-and-off lighting in neon bulb indicates extent of leakage. Accurate voltage leakage readings can be obtained on VTVM.

While the herein disclosed method and means for analyzing voltage leakage of a capacitor is extremely simple, it is highly effective. Yet it has not, to the best of my knowledge, ever previously been discovered or utilized.

Having thus described my invention, I claim as new and desire to protect by Letters Patent:

1. The method of testing and analyzing capacitors for voltage-leakage which includes the steps of: forming a substantially no-load test circuit by connecting one of the two terminals of a source of D.C. voltage to one of the two terminals of a visual voltage indicating neon bulb and connecting the two terminals of a voltage measuring VTVM in parallel with the two terminals of said visual voltage indicating neon bulb; connecting the two terminals of a capacitor to be tested and analyzed to said test circuit by switch means whereby one terminal of said capacitor is connected to the second terminal of said source of D.C. voltage and the second terminal of said capacitor is connected to the second terminal of said visual voltage indicating neon bulb to complete a closed circuit; visually detecting any excessive voltage-leakage of said capacitor by observing the illumination of said neon bulb; and further accurately measuring the exact value of any said voltage leakage of said capacitor while the capacitor remains connected in the test circuit by observing the voltage values indicated on said VTVM.

References Cited

UNITED STATES PATENTS

| | | | |
|---|---|---|---|
| 1,996,063 | 4/1935 | Corkran | 324—65 |
| 2,031,840 | 2/1936 | McCarty | 324—60 |

OTHER REFERENCES

Janning, J. J.: Measure Capacitance With a VTVM, Radio-Electronics, August 1959, p. 88.

EDWARD E. KUBASIEWICZ, Primary Examiner